US008810600B2

(12) United States Patent
Bohn et al.

(10) Patent No.: US 8,810,600 B2
(45) Date of Patent: Aug. 19, 2014

(54) WEARABLE DISPLAY DEVICE CALIBRATION

(75) Inventors: David D. Bohn, Fort Collins, CO (US); Stephen G. Latta, Seattle, WA (US); Jeffrey N. Margolis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 13/356,545

(22) Filed: Jan. 23, 2012

(65) Prior Publication Data

US 2013/0187943 A1    Jul. 25, 2013

(51) Int. Cl.
*G09G 5/00*    (2006.01)

(52) U.S. Cl.
USPC .................. 345/633; 345/619; 345/7; 345/8

(58) Field of Classification Search
CPC ........................................................ G02B 27/01
USPC .......................................... 345/619, 633, 7, 8
See application file for complete search history.

(56) References Cited

U.S. PATENT DOCUMENTS

| 5,359,444 A | 10/1994 | Piosenka et al. |
| 5,459,611 A | 10/1995 | Bohn et al. |
| 5,483,307 A | 1/1996 | Anderson |
| 5,574,473 A | 11/1996 | Sekiguchi |
| 5,583,609 A | 12/1996 | Mizutani et al. |
| 5,614,941 A | 3/1997 | Hines |
| 5,673,146 A | 9/1997 | Kelly |
| 5,708,449 A | 1/1998 | Heacock et al. |
| 5,714,967 A | 2/1998 | Okamura et al. |
| 5,751,476 A | 5/1998 | Matsui et al. |
| 5,982,553 A | 11/1999 | Bloom et al. |
| 6,160,667 A | 12/2000 | Smoot |
| 6,271,808 B1 | 8/2001 | Corbin |
| 6,377,401 B1 | 4/2002 | Bartlett |
| 6,529,331 B2 | 3/2003 | Massof et al. |

(Continued)

FOREIGN PATENT DOCUMENTS

| JP | 7311303 | 11/1995 |
| JP | 2001078234 | 3/2001 |

(Continued)

OTHER PUBLICATIONS

"HDTV Helmet Mounted Display", Available at <http://defense-update.com/products/h/HDTV-HMD.htm>,(Jan. 26, 2005),1 page.

(Continued)

*Primary Examiner* — Maurice L McDowell, Jr.
(74) *Attorney, Agent, or Firm* — Judy Yee; Micky Minhas

(57) ABSTRACT

In embodiments of wearable display device calibration, a first display lens system forms an image of an environment viewed through the first display lens system. A second display lens system also forms the image of the environment viewed through the second display lens system. The first display lens system emits a first reference beam and the second display lens system emits a second reference beam. The first display lens system then captures a reflection image of the first and second reference beams. The second display lens system also captures a reflection image of the first and second reference beams. An imaging application is implemented to compare the reflection images to determine a misalignment between the first and second display lens systems, and then apply an alignment adjustment to align the image of the environment formed by each of the first and second display lens systems.

20 Claims, 5 Drawing Sheets

(56) References Cited

U.S. PATENT DOCUMENTS

| | | | |
|---|---|---|---|
| 6,554,428 | B2 | 4/2003 | Fergason et al. |
| 6,577,411 | B1 | 6/2003 | David |
| 6,639,201 | B2 | 10/2003 | Almogy et al. |
| 6,753,828 | B2 * | 6/2004 | Tuceryan et al. ................. 345/8 |
| 6,775,460 | B2 | 8/2004 | Steiner et al. |
| 6,829,095 | B2 | 12/2004 | Amitai |
| 6,867,753 | B2 * | 3/2005 | Chinthammit et al. ........... 345/8 |
| 6,919,867 | B2 | 7/2005 | Sauer |
| 6,947,020 | B2 | 9/2005 | Kiser et al. |
| 6,964,731 | B1 | 11/2005 | Krisko et al. |
| 7,015,876 | B1 | 3/2006 | Miller |
| 7,048,385 | B2 | 5/2006 | Beeson et al. |
| 7,193,584 | B2 | 3/2007 | Lee |
| 7,359,420 | B2 | 4/2008 | Shchegrov et al. |
| 7,369,101 | B2 | 5/2008 | Sauer et al. |
| 7,417,617 | B2 | 8/2008 | Eichenlaub |
| 7,430,349 | B2 | 9/2008 | Jones |
| 7,430,355 | B2 | 9/2008 | Heikenfeld et al. |
| 7,542,665 | B2 | 6/2009 | Lei |
| 7,660,500 | B2 | 2/2010 | Konttinen et al. |
| 7,777,944 | B2 | 8/2010 | Ho et al. |
| 7,986,462 | B2 | 7/2011 | Kobayashi et al. |
| 8,446,340 | B2 * | 5/2013 | Aharoni ............................ 345/7 |
| 8,638,498 | B2 | 1/2014 | Bohn |
| 8,666,212 | B1 * | 3/2014 | Amirparviz ................... 385/119 |
| 2001/0043208 | A1 | 11/2001 | Furness, III et al. |
| 2004/0085649 | A1 | 5/2004 | Repetto et al. |
| 2006/0018025 | A1 | 1/2006 | Sharon et al. |
| 2006/0072206 | A1 | 4/2006 | Tsuyuki et al. |
| 2008/0043100 | A1 | 2/2008 | Sobel et al. |
| 2008/0311386 | A1 | 12/2008 | Wendt |
| 2009/0051283 | A1 | 2/2009 | Cok et al. |
| 2009/0128901 | A1 | 5/2009 | Tilleman et al. |
| 2009/0190003 | A1 | 7/2009 | Park et al. |
| 2010/0060551 | A1 | 3/2010 | Sugiyama et al. |
| 2010/0061078 | A1 | 3/2010 | Kim |
| 2010/0084674 | A1 | 4/2010 | Paetzold et al. |
| 2010/0141905 | A1 | 6/2010 | Burke |
| 2010/0213467 | A1 | 8/2010 | Lee et al. |
| 2010/0229853 | A1 | 9/2010 | Vandal et al. |
| 2010/0245387 | A1 | 9/2010 | Bachelder et al. |
| 2010/0317132 | A1 | 12/2010 | Rogers et al. |
| 2011/0012814 | A1 | 1/2011 | Tanaka |
| 2011/0032482 | A1 | 2/2011 | Agurok |
| 2011/0050655 | A1 | 3/2011 | Mukawa |
| 2011/0090343 | A1 | 4/2011 | Alt et al. |
| 2011/0091156 | A1 | 4/2011 | Laughlin |
| 2011/0194029 | A1 | 8/2011 | Herrmann et al. |
| 2011/0221659 | A1 | 9/2011 | King et al. |
| 2011/0248904 | A1 | 10/2011 | Miyawaki et al. |
| 2011/0267799 | A1 | 11/2011 | Epstein et al. |
| 2011/0299044 | A1 | 12/2011 | Yeh et al. |
| 2011/0309378 | A1 | 12/2011 | Lau et al. |
| 2012/0026161 | A1 | 2/2012 | Chen et al. |
| 2012/0162764 | A1 | 6/2012 | Shimizu |
| 2013/0162673 | A1 | 6/2013 | Bohn |
| 2013/0163089 | A1 | 6/2013 | Bohn |
| 2013/0170031 | A1 | 7/2013 | Bohn |
| 2013/0207964 | A1 | 8/2013 | Fleck |
| 2013/0208003 | A1 | 8/2013 | Bohn |
| 2013/0208362 | A1 | 8/2013 | Bohn |
| 2013/0208482 | A1 | 8/2013 | Fleck |
| 2014/0104685 | A1 | 4/2014 | Bohn |

FOREIGN PATENT DOCUMENTS

| | | |
|---|---|---|
| JP | 2008017135 | 1/2008 |
| KR | 20090076539 | 7/2009 |
| WO | WO-9418595 | 8/1994 |
| WO | WO-0195027 | 12/2001 |
| WO | WO-03090611 | 11/2003 |

OTHER PUBLICATIONS

Allen, Steven C., "ELiXIR—Solid-State Luminaire with Enhanced Light Extraction by Internal Reflection", *Journal of Display Technology*, vol. 3, No. 2, Available at <http://www.nanolab.uc.edu/Publications/PDFfiles/355.pdf>,(Jun. 2007),pp. 155-159.

Baluja, Shumeet et al., "Non-Intrusive Gaze Tracking Using Artificial Neural Networks", *Technical Report CMU-CS-94-102*, Available at <http://citeseerx.ist.psu.edu/viewdoc/download?doi=10.1.1.33.4027&rep=rep1&type=pdf>,(Jan. 5, 1994),14 pages.

Cheng, Yu-Hsiang et al., "Waveguide Displays Based on Polymer-dispersed Liquid Crystals", *SPIE Newsroom*, Available at <http://spie.org/documents/Newsroom/Imported/003805/003805_10.pdf>,(Aug. 12, 2011),2 pages.

Karp, Jason H., et al., "Planar Micro-optic Solar Concentration using Multiple Imaging Lenses into a Common Slab Waveguide", *In Proceedings of SPIE vol. 7407*, Available at <http://psilab.ucsd.edu/research/slab_concentration/files/SPIE_Slab_Published.pdf>,(Jan. 2009),11 pages.

"Non-Final Office Action", U.S. Appl. No. 13/397,495, (Nov. 13, 2013), 8 pages.

"Non-Final Office Action", U.S. Appl. No. 13/336,895, (Oct. 24, 2013), 9 pages.

"Notice of Allowance", U.S. Appl. No. 13/343,675, (Sep. 16, 2013), 8 pages.

"Non-Final Office Action", U.S. Appl. No. 13/343,675, (Jul. 16, 2013), 9 pages.

"PCT Search Report and Written Opinion", Application No. PCT/US2013/026200, (Jun. 3, 2013), 9 pages.

"Non-Final Office Action", U.S. Appl. No. 13/397,516, Nov. 25, 2013, 10 pages.

Singh Brar, Rajwinder et al., "Laser-Based Head-Tracked 3D Display Research", *Journal of Display Technology*, vol. 6, No. 10, Available at <http://ieeexplore.ieee.org/stamp/stamp.jsp?tp=&arnumber=5462999>,(Oct. 2010), pp. 531-543.

"PCT Search Report and Written Opinion", Application No. PCT/US2012/069330, (Mar. 28, 2013), 9 pages.

"PCT Search Report and Written Opinion", Application No. PCT/US2012/069331, (Mar. 29, 2013), 10 pages.

"PCT Search Report and Written Opinion", Application No. PCT/US2012/071563, (Apr. 25, 2013), 13 pages.

"Final Office Action", U.S. Appl. No. 13/397,495, May 29, 2014, 10 pages.

"Final Office Action", U.S. Appl. No. 13/336,895, May 27, 2014, 11 pages.

"Non-Final Office Action", U.S. Appl. No. 13/397,516, Jun. 12, 2014, 11 pages.

"Non-Final Office Action", U.S. Appl. No. 14/134,993, Apr. 17, 2014, 34 pages.

* cited by examiner

WEARABLE DISPLAY DEVICE CALIBRATION

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As an emerging technology, there are many challenges and design constraints with augmented reality, from generation of the virtual objects and images so that they appear realistic in a real environment, to developing the optics small and precise enough for implementation with a wearable display device.

A challenge to the implementation of wearable display devices, such as a head-mounted display (HMD), for augmented reality is maintaining the alignment of the two, independent left display lens system and right display lens system of a wearable display device. For binocular viewing systems, such as a wearable display device (e.g., glasses or a head-mounted display), the left and right display lens systems generate independent images of the same view. If the left and right display lens systems are not properly aligned so that the left and right images are projected directly one over the other, then the user's view will appear blurry. This is particularly noticeable for a vertical misalignment of the images, whereas a person's eyes can adjust to correct for a minor horizontal misalignment of the images. A conventional approach is to utilize a bulky and cumbersome opto-mechanical alignment system.

SUMMARY

This Summary introduces simplified concepts of wearable display device calibration, and the concepts are further described below in the Detailed Description and/or shown in the Figures. This Summary should not be considered to describe essential features of the claimed subject matter, nor used to determine or limit the scope of the claimed subject matter.

Wearable display device calibration is described. In embodiments, a first display lens system forms an image of an environment viewed through the first display lens system. A second display lens system also forms the image of the environment viewed through the second display lens system. The first display lens system emits a first reference beam and the second display lens system emits a second reference beam. The first display lens system then captures a reflection image of the first and second reference beams. The second display lens system also captures a reflection image of the first and second reference beams. An imaging application is implemented to compare the reflection images to determine a misalignment between the first and second display lens systems, and then apply an alignment adjustment to align the image of the environment formed by each of the first and second display lens systems.

In other embodiments, the reference beams are emitted as near infra-red beams from near infra-red lasers, and a camera captures the first and second reflection images. The first and second reflection images can include both the reflection of the first and second reference beams, and the imaging application compares the reflections of both the first and second reference beams in the first reflection image to the reflections of both the first and second reference beams in the second reflection image to determine the misalignment. The misalignment between the first and second display lens systems may appear as a vertical misalignment and/or a horizontal misalignment of the environment images formed by each of the first and second display lens systems.

In other embodiments, the near infra-red lasers each emit multiple beams that diverge to reflect a beam pattern as the first and second reflection images. Alternatively, the near infra-red lasers include collimation optics that disperse the first and second near infra-red beams in a structured light pattern. The imaging application can then determine an angular misalignment from the first and second reflection images that include the reflections of the structured light patterns. The imaging application can also determine a distance from each of first and second display lens systems to a feature in the environment that reflects the structured light patterns.

BRIEF DESCRIPTION OF THE DRAWINGS

Embodiments of wearable display device calibration are described with reference to the following Figures. The same numbers may be used throughout to reference like features and components that are shown in the Figures.

DETAILED DESCRIPTION

Embodiments of wearable display device calibration are described. As noted above, if the independent left and right display lens systems of a wearable display device are not properly aligned relative to each other so that overlapping left and right images are projected directly one over the other, then a user's view through the wearable display device will appear blurry. Wearable display device calibration provides techniques to determine a vertical and/or horizontal misalignment between the left and right display lens systems of a wearable display device (e.g., glasses or a head-mounted display) and then apply an alignment adjustment to align the overlapping images that a user views through the wearable display device.

While features and concepts of wearable display device calibration can be implemented in any number of different devices, systems, environments, and/or configurations, embodiments of wearable display device calibration are described in the context of the following example devices, systems, and methods.

Figure 1:
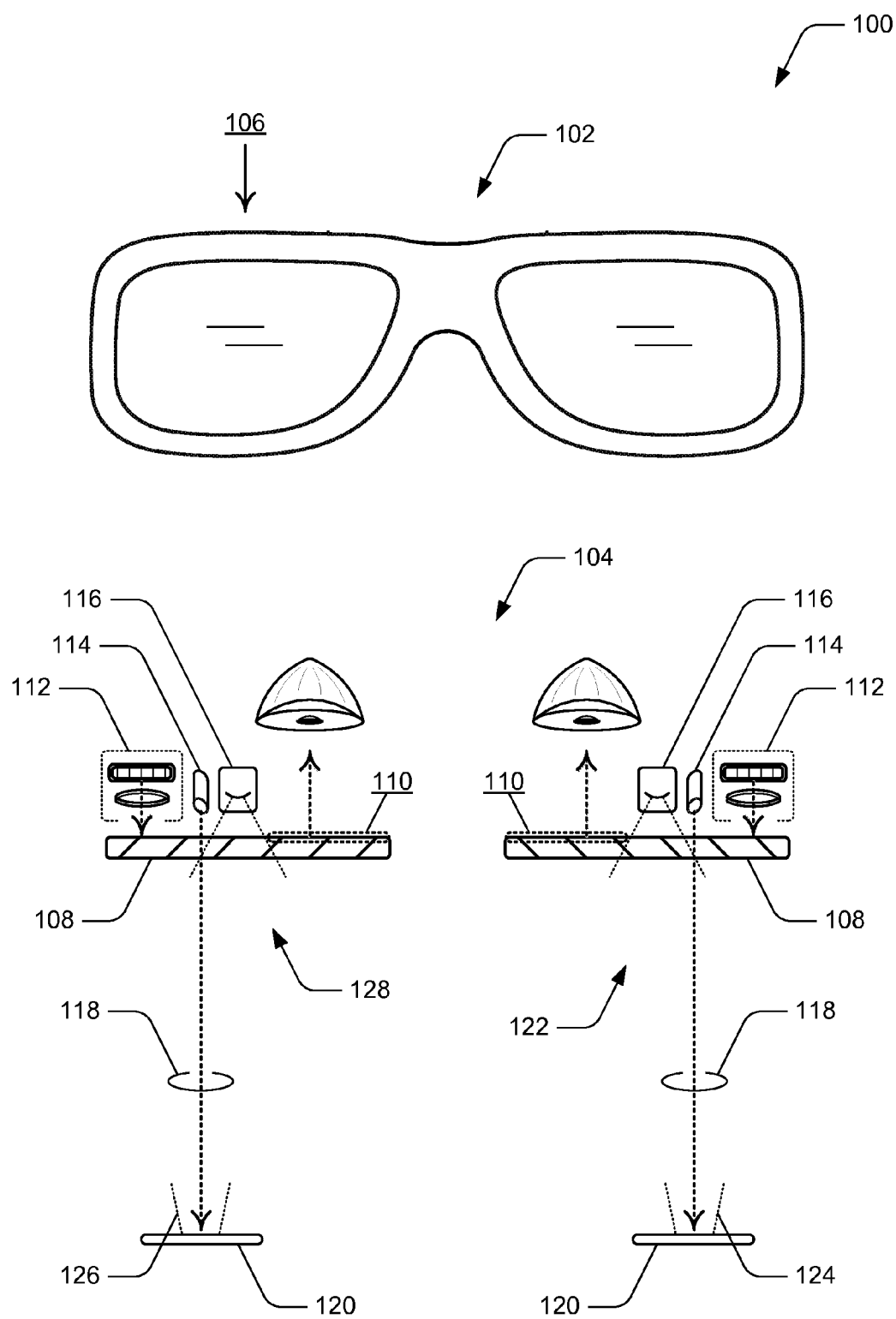
FIG. 1 illustrates an example system in which embodiments of wearable display device calibration can be implemented.

FIG. 1 illustrates an example system 100 in which various embodiments of wearable display device calibration can be implemented. An example wearable display device 102 includes left and right display lens systems, such as display lens systems 104 that are viewed from a perspective 106 of the wearable display device, as if viewing the display lens systems from the top of the device. In embodiments, the display lens systems 104 can be implemented as left and right display lens systems of the wearable display device described with reference to FIG. 3. A wearable display device can be implemented as any type of glasses or head-mounted display (HMD) that includes implementations of the display lens systems 104 (e.g., left and right display lens systems) through which a user can view the surrounding environment, yet also see virtual images that are generated for display and appear as a part of the environment. References to a left imaging system and a right imaging system, as described herein, correlate to a user's left and right eyes (e.g., from the perspective of wearing and looking through the wearable display device). Alternatively, the left and right imaging systems may be described from the perspective of looking at the wearable display device.

The display lens systems 104 include a display optic 108, such as a see-through and reflecting waveguide, through which light of an image 110 (e.g., an image of the environment as viewed through the wearable display device) is projected for viewing. In this example, the display lens systems 104 also include an imaging unit 112, which can be implemented with any number of micro display panels, lenses, and reflecting elements to display and project a virtual image into a see-through and reflecting waveguide. The see-through, reflecting waveguide (i.e., display optic 108) is implemented for internal reflection and conducts visible light of a virtual image that is generated by the imaging unit 112 for viewing by a user, and also passes through the light from the surrounding environment for viewing by the user. A display lens system 104 with an imaging unit can also be implemented with components of the display lens system described with reference to FIG. 3 to implement embodiments of wearable display device calibration.

In embodiments, the display lens systems 104 each include an infra-red laser 114 and a camera 116. The infra-red laser 114 emits a calibration reference beam 118, and can be implemented as a near infra-red laser that emits the calibration reference beam as a non-visible, near infra-red beam. The reference beams 118 that are emitted from the infra-red lasers are reflected off of a feature 120 in the environment and the cameras 116 capture the reflection images of the reference beams. The feature 120 in an environment that reflects the reference beams may be an interior wall or other surface in a room, or if outside, may be an exterior wall or surface of a building, as well as may be a smaller reflecting object. The infra-red lasers 114 can be implemented to each emit multiple beams that diverge to reflect a beam pattern. Alternatively or in addition, the infra-red lasers include collimation optics and diffractive optics that disperse the infra-red beams in a structured light pattern. The infra-red beams of collimated light are emitted parallel and narrowly disperse over a propagation distance to the point of being reflected.

The camera 116 of the left display lens system 122 captures a first reflection image that includes a reflection 124 of the reference beam that is emitted from the infra-red laser in the right display lens system. The first reflection image that is captured by the camera of the left display lens system also includes a reflection 126 of the reference beam that is emitted from the infra-red laser in the right display lens system 128. Similarly, the camera of the right display lens system 128 captures a second reflection image that includes the reflection 124 of the reference beam that is emitted from the infra-red laser in the left display lens system as well as the reflection 126 of the reference beam that is emitted from the infra-red laser in the right display lens system. Examples of the reflection images that are captured by the cameras 116 of the left and right display lens systems are shown and described with reference to FIG. 2.

The wearable display device 102 and/or a controller unit implements an imaging application, such as a software application, to implement embodiments of wearable display device calibration as described herein. Examples of controller units that can implement an imaging application for a wearable display device are described with reference to FIG. 3. In embodiments, the imaging application is implemented to compare the reflection images that are captured by the cameras 116 of the display lens systems to determine a misalignment between the left display lens system 122 and the right display lens system 128. Both of the display lens systems are independent in the wearable display device and the display lens systems may become misaligned relative to each other in the frame of the wearable display device, which results in misaligned imaging.

The first and second reflection images include both the reflection of the left and right reference beams 118, and the imaging application can compare the reflections of both the left and right reference beams in the first reflection image to the reflections of both the left and right reference beams in the second reflection image to determine the misalignment. The misalignment between the left display lens system 122 and the right display lens system 128 may appear as a rotation of the two virtual images relative to each other, as a vertical misalignment, and/or as a horizontal misalignment of the environment images 110 that are formed by each of the left and right display lens systems. The imaging application can then apply an alignment adjustment to align the display images 110 of the environment that are formed by each of the left and right display lens systems so that the separate, overlapping left and right images are viewed as a single image by the user. The imaging application adjusts the relative position of the overlapping display images to keep them in a proper binocular alignment. Further, the wearable display device calibration can be updated and/or periodically implemented to actively align the overlapping display images during use of the wearable display device.

The imaging application can also determine a distance from each of left and right display lens systems to the feature 120 in the environment that reflects the structured light patterns, such as from the divergence of the structured light patterns. Alternatively or in addition, the display lens systems 104 may include a distance sensor to provide the distance from a display lens system to the feature in the environment that reflects the calibration reference beams 118. The imaging application can also determine an angular misalignment from the first and second reflection images that include reflections of the structured light patterns. The angular misalignment can be determined utilizing the determined distance, and the imaging application can then compensate for the angular misalignment.

Figure 2:
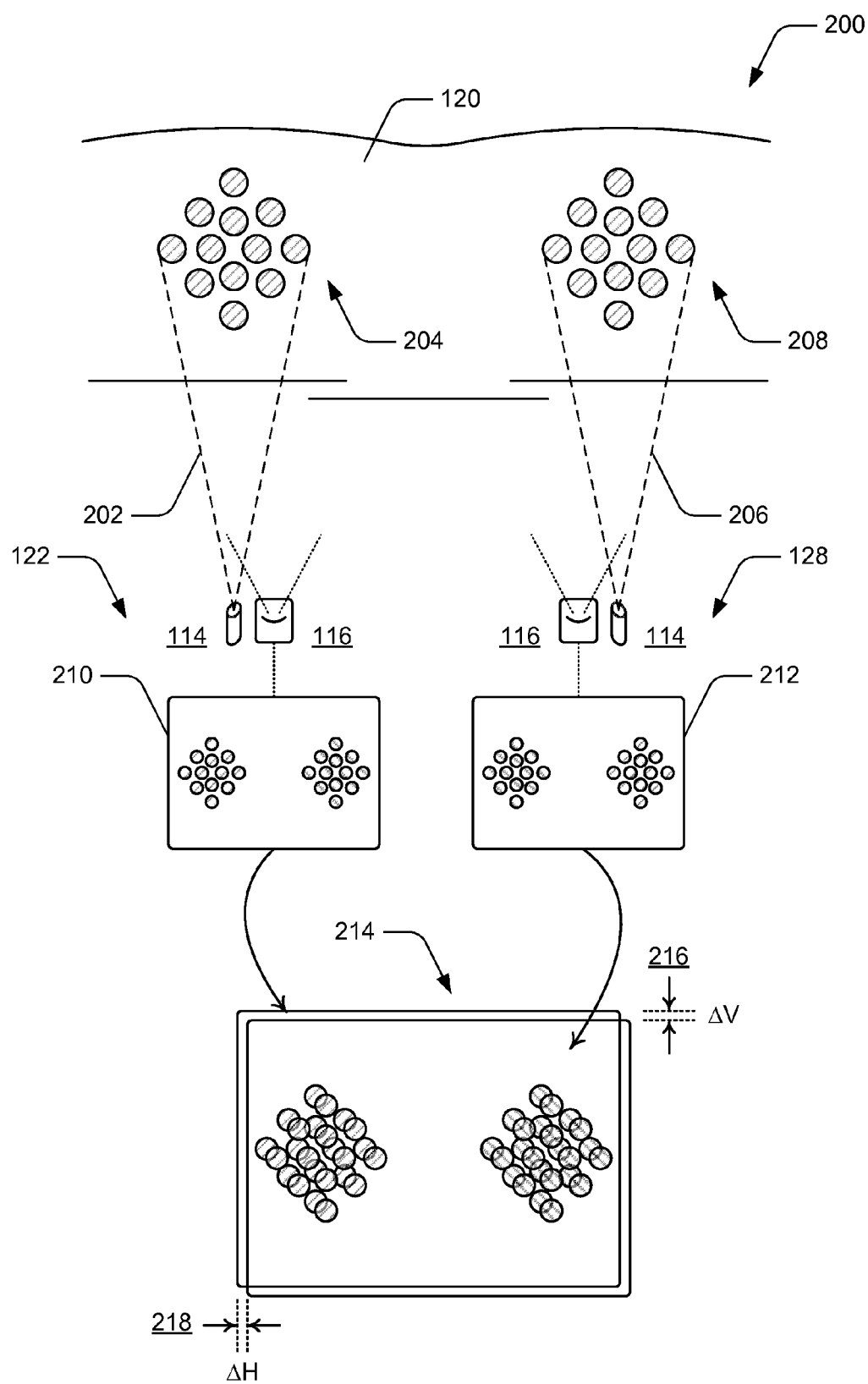
FIG. 2 illustrates an example of calibration reference beams and determining an alignment adjustment from reflection images of the calibration reference beams in accordance with one or more embodiments.

FIG. 2 illustrates an example 200 of calibration reference beams and determining an alignment adjustment from reflection images of the calibration reference beams. As described with reference to FIG. 1, the left and right display lens systems 104 each include an infra-red laser 114 and a camera 116. In this example, the infra-red laser of the left display lens system 122 emits a calibration reference beam 202 that reflects off of the feature 120 in the environment as a reflection 204. Similarly, the infra-red laser of the right display lens system 128 emits a calibration reference beam 206 that reflects off of the feature 120 in the environment as a reflection 208.

The camera 116 of the left display lens system 122 captures a reflection image 210 that includes the reflection 204 and the reflection 208 of the reference beams that are emitted from the infra-red lasers 114 of the display lens systems. Similarly, the camera 116 of the right display lens system 128 captures a reflection image 212 that includes the reflection 204 and the reflection 208 of the reference beams that are emitted from the infra-red lasers 114 of the display lens systems. The imaging application can then compare the two reflection images 210 and 212 as shown at 214 to determine a vertical misalignment 216 and/or a horizontal misalignment 218, from which the imaging application can then generate an alignment adjustment that is applied to correct any imaging misalignments.

Figure 3:
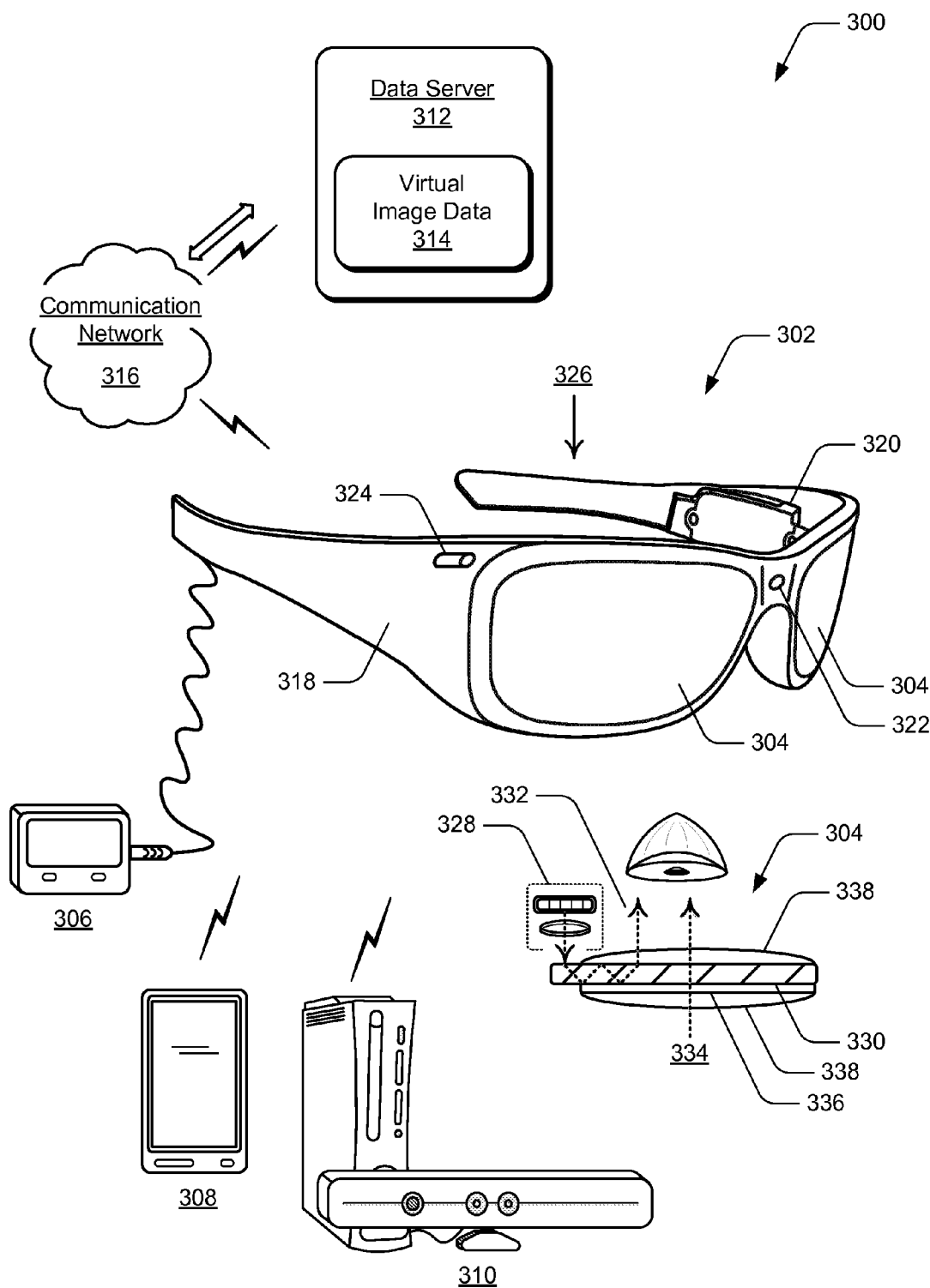
FIG. 3 illustrates an example system that includes an example of a wearable display device in which embodiments of wearable display device calibration can be implemented.

FIG. 3 illustrates an example system 300 that includes an example wearable display device 302 in which embodiments of wearable display device calibration can be implemented. The wearable display device can be implemented as any type of glasses or head-mounted display (HMD) that includes display lens systems 304 (e.g., left and right display lens systems) through which a user can view the surrounding environment, yet also see virtual images (e.g., any type of object, video, text, graphic, and the like) that are generated for display and appear as a part of the environment.

The wearable display device 302 can be implemented as an independent, portable system that includes memory, software, a processor, and/or a power source. Alternatively or in addition, the wearable display device may be communicatively linked to a controller 306 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 5. For example, the controller and/or the wearable display device includes an imaging application implemented as computer-executable instructions, such as a software application, and executed by a processor to implement embodiments of wearable display device calibration as described herein.

In embodiments, the controller may be implemented as a dedicated device (e.g., the wired controller 306), as a mobile phone 308, a tablet or other portable computer device, a gaming system 310, or as any other type of electronic device that can be implemented to process and generate virtual images for display as part of the environment that is viewed through the display lens system of the wearable display device. The controller may communicate with the wearable display device wirelessly via WiFi™, Bluetooth™, infrared (IR), RFID transmission, wireless Universal Serial Bus (WUSB), cellular, or via other wireless communication techniques.

The example system 300 also includes a data server 312, or data service, that communicates, or otherwise distributes, virtual image data 314 to the wearable display device 302 via a communication network 316. For example, the data server may be part of a network-based gaming system that generates virtual images for augmented reality display at the wearable display device. Alternatively, the data server may be part of a navigation system that communicates navigation directions and information for display in the display lens systems 304 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 316, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 302 includes a frame 318, such as in the form of glasses, goggles, or any other structure, that supports and incorporates the various components of the device, as well as serves as a conduit for electrical and other component connections. A components module 320 (or components modules on the left, right, and/or both sides of the device frame) incorporates any of the various components, such as processing and control circuitry, memory, software, a processor, GPS transceiver, and/or power source. The wearable display device may also include a microphone 322 to record audio data from the surrounding environment, as well as ear phones for audio feedback as part of an augmented reality experience.

The wearable display device 302 also includes various cameras 324 that capture video and still images of the surrounding environment. The image and video data can be processed on the device and/or by a controller device (e.g., controller 306), and used to create a mapping field to orient and track a user in the environment space. The wearable display device can also include eye tracking cameras used to determine a user's eyeball location and track eye movements. The wearable display device may also include a temperature sensor, as well as inertial sensors for sensing position, orientation, and acceleration of the wearable display device.

An example of one display lens system 304 is shown from a viewer perspective 326 of the wearable display device 302, as if viewing the display lens system from the top of the device. The display lens system includes an imaging system 328, which can be implemented with any number of micro display panels, lenses, and reflecting elements to display and project a virtual image into a see-through and reflecting waveguide 330. A display lens system 304 can also be implemented as any of the imaging systems described with reference to FIG. 1 to implement embodiments of wearable display device calibration. The see-through, reflecting waveguide 330 is implemented for internal reflection and conducts the visible light 332 of a virtual image that is generated by the imaging unit for viewing by a user, and also passes through the light 334 from the surrounding environment for viewing by the user.

The micro display panels, lenses, and/or reflecting elements of the imaging system 328 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging system 328 (or other components of a display lens system 304) can be implemented to include an infra-red (IR) laser utilized for system calibrations and/or as an illumination source for an eye-tracking system and camera that tracks the position of a user's eyes. The eye-tracking system includes the eye-tracking illumination source, which is not a visible light, and includes an eye-tracking IR sensor. The IR sensor can be implemented as an IR camera that provides infrared image data of the eye for eye-tracking processing, or an IR sensor that detects eye reflections when the eye is illuminated. The see-through and reflecting waveguide 330 can also be utilized for the infrared illumination, and for eyeball reflections that the eye-tracking system uses to track the position of the user's eyes.

In this example, the display lens systems 304 include an optional opacity filter 336, and a see-through lens 338 on each side of the waveguide 330. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example method 400 is described with reference to FIG. 4 in accordance with one or more embodiments of wearable display device calibration. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
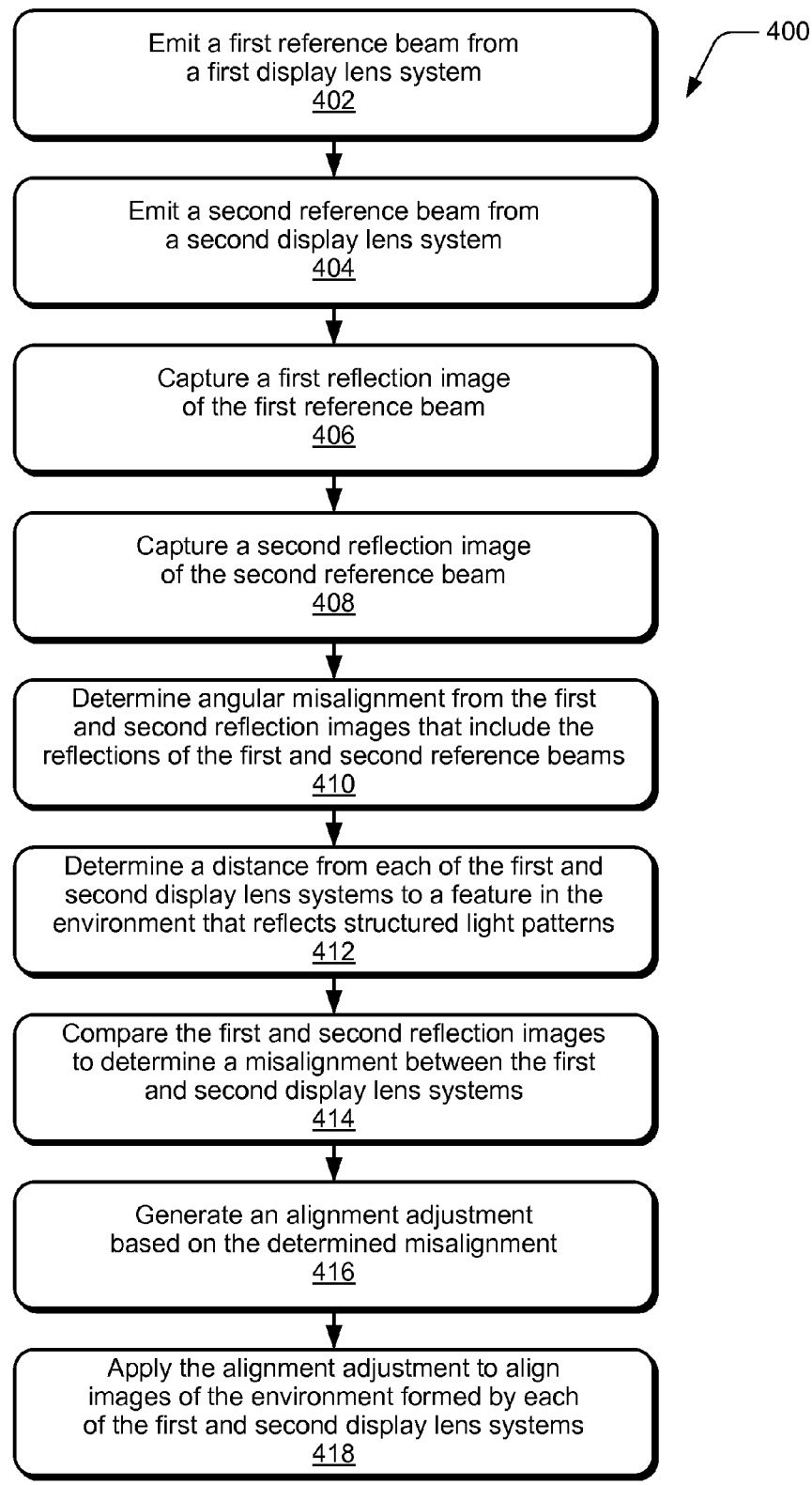
FIG. 4 illustrates example method(s) of wearable display device calibration in accordance with one or more embodiments.

FIG. 4 illustrates example method(s) 400 of wearable display device calibration. The order in which the method blocks are described are not intended to be construed as a limitation, and any number of the described method blocks can be combined in any order to implement a method, or an alternate method.

At block 402, a first reference beam is emitted from a first display lens system. For example, the left display lens system 122 (FIG. 1) forms an image of the environment as viewed through the display lens system and includes a near infra-red laser 114 that emits a reference beam 202 (FIG. 2). The reference beam 202 may be emitted as multiple beams that diverge to reflect a beam pattern and/or the infra-red laser includes collimation optics and diffractive optics that disperse the reference beam in a structured light pattern.

At block 404, a second reference beam is emitted from a second display lens system. For example, the right display lens system 128 also forms the image of the environment as viewed through the display lens system and includes a near infra-red laser 114 that emits a reference beam 206. The reference beam 206 may also be emitted as multiple beams that diverge to reflect a beam pattern and/or the infra-red laser includes collimation optics that disperse the reference beam in a structured light pattern.

At block 406, a first reflection image of the first reference beam is captured. For example, the camera 116 of the left display lens system 122 captures the reflection image 210 that includes both the first reflection 204 of the first reference beam 202 and the second reflection 208 of the second reference beam 206. At block 408, a second reflection image of the second reference beam is captured. For example, the camera 116 of the right display lens system 128 captures the reflection image 212 that includes both the first reflection 204 of the first reference beam 202 and the second reflection 208 of the second reference beam 206.

At block 410, an angular misalignment is determined from the first and second reflection images that include the reflections of the first and second reference beams. For example, an imaging application 520 determines an angular misalignment based on a comparison of the first reflection image 210 and the second reflection image 212 that both include reflections of the reference beams as structured light patterns. At block 412, a distance is determined from each of the first and second display lens systems to a feature in the environment that reflects the structured light patterns. For example, the imaging application 520 determines a distance from each of left and right display lens systems to the feature 120 in the environment that reflects the structured light patterns, such as from the divergence of the structured light patterns.

At block 414, the first and second reflection images are compared to determine a misalignment between the first and second display lens systems. For example, the imaging application 520 compares the reflection images that are captured by the cameras 116 of the display lens systems to determine a vertical and/or horizontal misalignment between the left display lens system 122 and the right display lens system 128. The first reflection image 210 and the second reflection image 212 each include both the first reflection 204 of the first reference beam 202 and the second reflection 208 of the second reference beam 206, and the imaging application compares the two reflection images as shown at 214 to determine the vertical misalignment 216 and/or the horizontal misalignment 218.

At block 416, an alignment adjustment is generated based on the determined misalignment and, at block 418, the alignment adjustment is applied to align images of the environment formed by each of the first and second display lens systems. For example, the imaging application 502 generates an alignment adjustment to align the display images 110 of the environment that are formed by each of the left and right display lens systems so that the separate, overlapping left and right images are viewed as a single image by the user.

Figure 5:
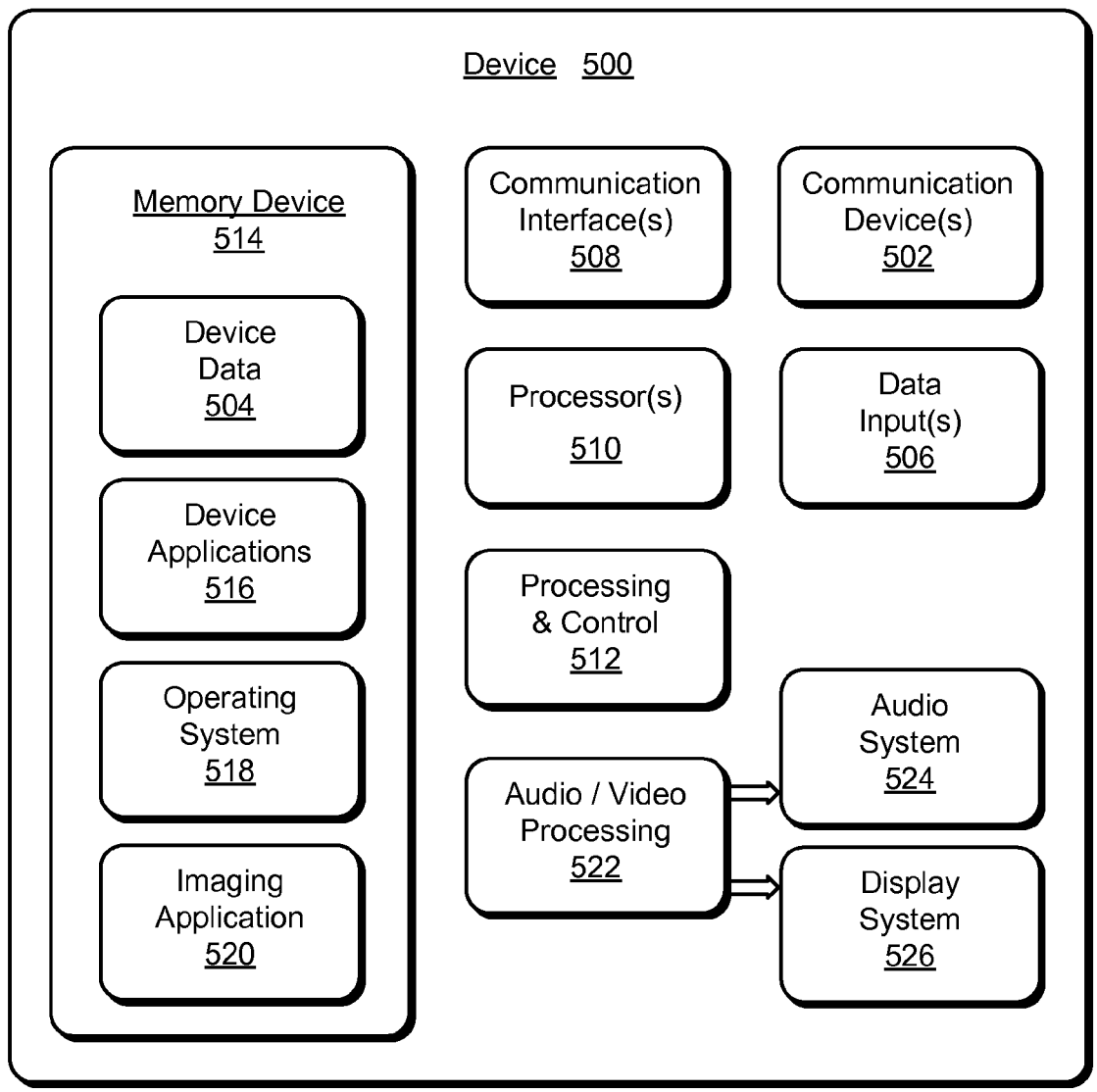
FIG. 5 illustrates various components of an example device that can implement embodiments of wearable display device calibration.

FIG. 5 illustrates various components of an example device 500 that can be implemented as any of the devices described with reference to the previous FIGS. 1-4, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504, such as virtual image data, as well as video and images data, and other media content stored on the device. The media content stored on the device can include any type of audio, video, and/or image data. The device includes one or more data inputs 506 via which any type of data, media content, and/or inputs can be received, such as user-selectable inputs and any other type of audio, video, and/or image data received from any content and/or data source.

The device 500 also includes communication interfaces 508, such as any one or more of a serial, parallel, network, or wireless interface. The communication interfaces provide a connection and/or communication links between the device and a communication network by which other electronic, computing, and communication devices communicate data with the device.

The device 500 includes one or more processors 510 (e.g., any of microprocessors, controllers, and the like), which process computer-executable instructions to control the operation of the device. Alternatively or in addition, the device can be implemented with any one or combination of software, hardware, firmware, or fixed logic circuitry that is implemented in connection with processing and control circuits which are generally identified at 512. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices 514 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 514 provides data storage mechanisms to store the device data 504, other types of information and/or data, and device applications 516. For example, an operating system 518 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 520 that implements embodiments of wearable display device calibration as described herein.

The device 500 may also include an audio and/or video processing system 522 that generates audio data for an audio system 524 and/or generates display data for a display system 526. In implementations, the audio system and/or the display system are external components to the device. Alternatively, the audio system and/or the display system are integrated components of the example device.

Although embodiments of wearable display device calibration have been described in language specific to features and/or methods, the appended claims are not necessarily limited to the specific features or methods described. Rather, the specific features and methods are disclosed as example implementations of wearable display device calibration.

The invention claimed is:

1. A system, comprising:
a first display lens system configured to form an image of an environment viewed through the first display lens system, the first display lens system further configured to emit a first reference beam and capture a first reflection image of the first reference beam;
a second display lens system configured to form the image of the environment viewed through the second display lens system, the second display lens system further configured to emit a second reference beam and capture a second reflection image of the second reference beam;
an imaging application configured to:
compare the first the second reflection images to determine a misalignment between the first and second display lens systems; and
apply an alignment adjustment to align the image of the environment formed by each of the first and second display lens systems.

2. A system as recited in claim 1, wherein:
the first and second reflection images include both the reflection of the first and second reference beams; and
the imaging application is configured to compare the reflections of both the first and second reference beams in the first reflection image to the reflections of both the first and second reference beams in the second reflection image to determine the misalignment.

3. A system as recited in claim 1, wherein the misalignment between the first and second display lens systems appears as at least one of a vertical misalignment or a horizontal misalignment of the image of the environment formed by each of the first and second display lens systems.

4. A system as recited in claim 1, wherein each of the first and second display lens systems include:
an near infra-red laser configured to emit the respective first and second reference beams as near infra-red beams; and
a camera configured to capture the respective first and second reflection images.

5. A system as recited in claim 4, wherein the near infra-red lasers each emit multiple beams that diverge to reflect a beam pattern as the first and second reflection images.

6. A system as recited in claim 5, wherein the imaging application is further configured to:
determine angular misalignment from the first and second reflection images that include the reflections of the structured light patterns; and
determine a distance from each of first and second display lens systems to a feature in the environment that reflects the structured light patterns.

7. A system as recited in claim 4, wherein the near infra-red lasers include collimation optics and diffractive optics configured to disperse the first and second near infra-red beams in a structured light pattern.

8. A method, comprising:
emitting a first reference beam from a first display lens system that forms an image of an environment as viewed through the first display lens system;
capturing a first reflection image of the first reference beam;
emitting a second reference beam from a second display lens system that forms the image of the environment as viewed through the second display lens system;
capturing a second reflection image of the second reference beam;

comparing the first and second reflection images to determine a misalignment between the first and second display lens systems; and applying an alignment adjustment to align the image of the environment formed by each of the first and second display lens systems.

9. A method as recited in claim 8, wherein:

the first and second reflection images include both the reflection of the first and second reference beams; and said comparing the reflections of both the first and second reference beams in the first reflection image to the reflections of both the first and second reference beams in the second reflection image to determine the misalignment.

10. A method as recited in claim 8, wherein the misalignment between the first and second display lens systems appears as at least one of a vertical misalignment or a horizontal misalignment of the image of the environment formed by each of the first and second display lens systems.

11. A method as recited in claim 8, wherein the first and second reference beams are emitted as near infra-red beams from a first near infra-red laser of the first display lens system and a second near infra-red laser of the second display lens system.

12. A method as recited in claim 11, wherein the first and second reference beams are each emitted as multiple beams that diverge to reflect a beam pattern as the first and second reflection images.

13. A method as recited in claim 12, further comprising:

determining angular misalignment from the first and second reflection images that include the reflections of the structured light patterns; and determining a distance from each of first and second display lens systems to a feature in the environment that reflects the structured light patterns.

14. A method as recited in claim 11, further comprising dispersing each of the near infra-red beams in a structured light pattern.

15. A wearable display device, comprising:

a left display lens system for augmented reality imaging configured to emit a first reference beam with a first near infra-red laser;

a right display lens system for the augmented reality imaging configured to emit a second reference beam with a second near infra-red laser;

a left camera configured to capture a first reflection image of the first reference beam;

a right camera configured to capture a second reflection image of the second reference beam;

an imaging application configured to:

compare the first the second reflection images to determine a misalignment between the left and right display lens systems; and align the augmented reality imaging of the left and right display lens systems based on the determined misalignment.

16. A wearable display device as recited in claim 15, wherein:

the first and second reflection images include both the reflection of the first and second reference beams; and the imaging application is configured to compare the reflections of both the first and second reference beams in the first reflection image to the reflections of both the first and second reference beams in the second reflection image to determine the misalignment.

17. A wearable display device as recited in claim 15, wherein the misalignment between the left and right display lens systems appears as at least one of a vertical misalignment or a horizontal misalignment of the augmented reality imaging.

18. A wearable display device as recited in claim 15, wherein the first and second near infra-red lasers each emit multiple beams that diverge to reflect a beam pattern as the first and second reflection images.

19. A wearable display device as recited in claim 15, wherein the first and second near infra-red lasers each include collimation optics configured to disperse the first and second reference beams in a structured light pattern.

20. A wearable display device as recited in claim 19, wherein the imaging application is further configured to:

determine angular misalignment from the first and second reflection images that include the reflections of the structured light patterns; and determine a distance from each of left and right display lens systems to a feature in an environment that reflects the structured light patterns.

* * * * *